United States Patent
Bobek et al.

(10) Patent No.: US 11,697,929 B2
(45) Date of Patent: Jul. 11, 2023

(54) ANTI-SCALD DEVICE FOR FLUID SUPPLY SYSTEM HAVING HOT WATER DISINFECTION

(71) Applicant: GEBERIT INTERNATIONAL AG, Jona (CH)

(72) Inventors: Robert Bobek, Palos Hills, IL (US); Prasert Buranatum, Skokie, IL (US)

(73) Assignee: Geberit International AG, Jona (CH)

( * ) Notice: Subject to any disclaimer, the term of this patent is extended or adjusted under 35 U.S.C. 154(b) by 194 days.

(21) Appl. No.: 17/351,909

(22) Filed: Jun. 18, 2021

(65) Prior Publication Data

US 2021/0317643 A1 Oct. 14, 2021

Related U.S. Application Data

(63) Continuation of application No. PCT/US2020/013865, filed on Jan. 16, 2020.

(60) Provisional application No. 62/794,278, filed on Jan. 18, 2019.

(51) Int. Cl.
 *E03C 1/04* (2006.01)
 *E03C 1/10* (2006.01)

(52) U.S. Cl.
 CPC ............... *E03C 1/041* (2013.01); *E03C 1/10* (2013.01)

(58) Field of Classification Search
 CPC .................................. E03C 1/041; E03C 1/10
 See application file for complete search history.

(56) References Cited

U.S. PATENT DOCUMENTS

| | | | |
|---|---|---|---|
| 2,235,651 A | 3/1941 | Slezak | |
| 2,556,777 A | 6/1951 | Reimuller | |
| 3,891,005 A | 6/1975 | Manoogian et al. | |
| 3,893,481 A | 7/1975 | Watts | |
| 3,921,659 A | 11/1975 | Rudewick, III | |
| 4,080,156 A | 3/1978 | Moriya | |
| 4,121,761 A * | 10/1978 | Nolden | G05D 23/1353 236/12.11 |
| 4,313,350 A | 2/1982 | Keller, III et al. | |
| 4,669,653 A | 6/1987 | Avelöv | |
| 4,834,873 A | 5/1989 | Burrows | |
| 5,123,593 A | 6/1992 | Rundle | |
| 5,326,075 A | 7/1994 | Goff | |
| 5,340,018 A | 8/1994 | MacDonald | |
| 5,368,227 A | 11/1994 | McGinnis | |

(Continued)

FOREIGN PATENT DOCUMENTS

| | | | |
|---|---|---|---|
| AU | 2017200743 A1 | 8/2017 | |
| DE | 2917233 A1 | 11/1979 | |

(Continued)

OTHER PUBLICATIONS

Horne Engineering Ltd., "HORNE 15 and 20 thermostatic mixing valve specification manual 2009." Mar. 2009, vol. 3, 14 pages. URL: https://www.aqva.fi/files/HORNE%20H20%20esite%20Brochure_H20-11B.pdf.

(Continued)

*Primary Examiner* — Kevin R Barss
(74) *Attorney, Agent, or Firm* — Polsinelli PC

(57) ABSTRACT

An anti-scald device, fluid supply system including an anti-scald device and methods are provided. The anti-scald device can be configured to provide scald protection as well as configured to allow hot water disinfection.

26 Claims, 9 Drawing Sheets

(56) References Cited

U.S. PATENT DOCUMENTS

| | | | |
|---|---|---|---|
| 5,462,224 A | 10/1995 | Enoki et al. | |
| 5,560,541 A | 10/1996 | Warshawsky et al. | |
| 5,713,391 A | 2/1998 | Ko | |
| 5,904,291 A | 5/1999 | Knapp | |
| 5,979,777 A | 11/1999 | Ems | |
| 6,019,130 A | 2/2000 | Rump | |
| 6,042,015 A | 3/2000 | Eveleigh et al. | |
| 6,095,494 A | 8/2000 | Eagle | |
| 6,170,523 B1 | 1/2001 | Chang | |
| 6,186,473 B1 | 2/2001 | Miller | |
| 6,237,853 B1 | 5/2001 | Bergmann | |
| 6,257,493 B1 | 7/2001 | Chamot et al. | |
| 6,283,447 B1 | 9/2001 | Fleet | |
| 6,390,128 B1 | 5/2002 | Tung | |
| 6,513,787 B1 | 2/2003 | Jeromson et al. | |
| 6,517,006 B1 | 2/2003 | Knapp | |
| 6,536,464 B1 | 3/2003 | Lum et al. | |
| 6,557,770 B2 | 5/2003 | Mace et al. | |
| 6,854,658 B1 | 2/2005 | Houghton et al. | |
| 6,886,755 B2 | 5/2005 | Bergmann et al. | |
| 6,899,132 B2 | 5/2005 | Mikiya et al. | |
| 6,929,187 B2 | 8/2005 | Kempf et al. | |
| 6,957,778 B2 | 10/2005 | Bergmann et al. | |
| 7,073,528 B2 | 7/2006 | Kempf et al. | |
| 7,140,382 B2 | 11/2006 | Kempf et al. | |
| 7,163,157 B2 | 1/2007 | Goncze et al. | |
| 7,198,059 B2 | 4/2007 | Kempf et al. | |
| 7,287,707 B2 | 10/2007 | Kempf et al. | |
| 7,392,955 B1 | 7/2008 | Laing | |
| 7,407,113 B2 | 8/2008 | Guterman | |
| 7,475,703 B2 | 1/2009 | Kempf et al. | |
| 7,648,078 B2 | 1/2010 | Kempf et al. | |
| 7,673,808 B2 | 3/2010 | Mace et al. | |
| 7,681,804 B2 | 3/2010 | Lockhart | |
| 7,775,450 B2 | 8/2010 | Warshawsky | |
| 7,874,498 B2 | 1/2011 | Kempf et al. | |
| 7,878,417 B2 | 2/2011 | Brown et al. | |
| 8,020,779 B2 | 9/2011 | Jarvis | |
| 8,091,793 B2 | 1/2012 | Kempf et al. | |
| 8,118,057 B2 | 2/2012 | Deutsch et al. | |
| 8,210,441 B2 | 7/2012 | Kempf et al. | |
| 8,434,693 B2 | 5/2013 | Brown et al. | |
| 8,464,962 B2 | 6/2013 | Lockhart | |
| 8,505,830 B2 | 8/2013 | Kempf et al. | |
| 8,522,814 B2 | 9/2013 | Kempf et al. | |
| 8,656,954 B2 | 2/2014 | Deutsch et al. | |
| 8,820,652 B2 | 9/2014 | Kempf et al. | |
| 8,820,653 B2 | 9/2014 | Kempf et al. | |
| 9,235,220 B2 | 1/2016 | Goncze | |
| 9,309,655 B2 | 4/2016 | Brown et al. | |
| 9,464,416 B1 | 10/2016 | Breda | |
| 9,611,629 B2 | 4/2017 | Brown et al. | |
| 9,732,866 B2 | 8/2017 | Dolgos | |
| 9,927,042 B2 | 3/2018 | Brown et al. | |
| 10,119,253 B2 | 11/2018 | Seggio et al. | |
| 10,138,620 B2 | 11/2018 | Block et al. | |
| 10,167,964 B1 | 1/2019 | Chang | |
| 10,487,482 B2 | 11/2019 | Dolgos | |
| 10,802,511 B2 | 10/2020 | Forrestal et al. | |
| 2005/0173545 A1 | 8/2005 | Strader et al. | |
| 2006/0049267 A1 | 3/2006 | Lum et al. | |
| 2007/0131783 A1 | 6/2007 | Kempf et al. | |
| 2009/0000026 A1* | 1/2009 | Hanson | G05D 23/1346 236/12.1 |
| 2009/0001310 A1* | 1/2009 | Hanson | E03C 1/04 251/366 |
| 2009/0090884 A1 | 4/2009 | Jarvis | |
| 2009/0200388 A1 | 8/2009 | Jarvis | |
| 2010/0116895 A1 | 5/2010 | Kures | |
| 2011/0240155 A1* | 10/2011 | Platet | G05D 23/1353 137/605 |
| 2012/0118415 A1 | 5/2012 | Waudoit | |
| 2013/0248019 A1 | 9/2013 | Frick et al. | |
| 2013/0269799 A1 | 10/2013 | Swist | |
| 2013/0340853 A1 | 12/2013 | Peel | |
| 2014/0034166 A1 | 2/2014 | Kempf et al. | |
| 2014/0261781 A1 | 9/2014 | Dolgos | |
| 2015/0355648 A1 | 12/2015 | Tempel et al. | |
| 2016/0011606 A1* | 1/2016 | Draber | G05D 23/1353 236/12.21 |
| 2016/0018010 A1* | 1/2016 | Forrestal | F16K 31/002 236/12.1 |
| 2016/0266587 A1* | 9/2016 | Draber | G05D 23/132 |
| 2017/0292251 A1 | 10/2017 | Dolgos | |
| 2017/0342690 A1 | 11/2017 | Block et al. | |
| 2017/0370077 A1 | 12/2017 | Schmitt et al. | |
| 2018/0216747 A1 | 8/2018 | Brown et al. | |
| 2018/0321697 A1 | 11/2018 | Forrestal et al. | |
| 2019/0101944 A1 | 4/2019 | Main et al. | |
| 2019/0106865 A1 | 4/2019 | Dolgos | |
| 2019/0177956 A1 | 6/2019 | Seggio et al. | |
| 2021/0041900 A1 | 2/2021 | Forrestal et al. | |
| 2021/0191432 A1* | 6/2021 | Wilson | G05D 23/022 |

FOREIGN PATENT DOCUMENTS

| | | |
|---|---|---|
| EP | 0504427 A1 | 9/1992 |
| EP | 0745798 A2 | 12/1996 |
| EP | 0759522 A1 | 2/1997 |
| EP | 1739333 A1 | 1/2007 |
| EP | 1903268 A2 | 3/2008 |
| EP | 1965109 A1 | 9/2008 |
| EP | 1963723 B1 | 3/2009 |
| EP | 2762646 A1 | 8/2014 |
| EP | 2789885 A1 | 10/2014 |
| EP | 2386927 B1 | 9/2017 |
| EP | 3272952 A1 | 1/2018 |
| EP | 1803044 B1 | 7/2018 |
| FR | 2916033 A1 | 11/2008 |
| GB | 2399402 A | 9/2004 |
| GB | 2451800 A | 2/2009 |
| GB | 2516897 A | 2/2015 |
| JP | 2009186014 A | 8/2009 |
| WO | 91/011643 A1 | 8/1991 |
| WO | 2004/068252 A2 | 8/2004 |
| WO | 2006/010880 A1 | 2/2006 |
| WO | 2009/050531 A2 | 4/2009 |
| WO | 2014/136001 A1 | 9/2014 |

OTHER PUBLICATIONS

Zurn, "Zurn Sierra Faucet z7440-XL-BA." Apr. 25, 2017, 1 page. URL: https://www.zurn.com/media-library/web_documents/pdfs/specsheets/301008-pdf.

Zurn, "Zurn Single Control Faucet Z81000-XL." Nov. 9, 2017, 1 page. URL: https://www.zurn.com/media-library/web_documents/pdfs/specsheets/93000-pdf.

The Chicago Faucet Company, "Thermostatic Mixing Valve." Apr. 2016, 4 pages. URL: https://www.chicagofaucets.com/sites/default/files/2018-11/865.497.00.0.pdf.

The Chicago Faucet Company, "Electronic Faucets Performance You Can Count On." Apr. 2017, 24 pages. URL: https://repnet.chicagofaucets.com/pdf/CF1074.pdf.

* cited by examiner

ANTI-SCALD DEVICE FOR FLUID SUPPLY SYSTEM HAVING HOT WATER DISINFECTION

CROSS-REFERENCE TO RELATED PATENT APPLICATIONS

This patent application is a continuation of International Application No. PCT/US2020/013865, filed Jan. 16, 2020, which claims the benefit of U.S. Provisional Application No. 62/794,278, filed Jan. 18, 2019, the entire teachings and disclosures of both applications are incorporated herein by reference thereto.

FIELD OF THE INVENTION

This invention generally relates to anti-scald devices and particularly anti-scald devices for faucets.

BACKGROUND OF THE INVENTION

Faucets or other water supply systems such as showers will include anti-scald devices to prevent the temperature of water exiting the system from exceeding a predetermined temperature.

Often, in these anti-scald devices, a thermostatic element controls a valve member that regulates, at least, the flow of hot water through the system based on the temperature of the water. In some embodiments, the valve member can simultaneously regulate the flow of cold water. The thermostatic element often takes the form of a wax element or a bimetallic element that responds to the temperature of the water.

For example, as the temperature of the water contacting the thermostatic element increases, the thermostatic element will progressively reduce the flow of hot water through the system. If the temperature surpasses a desired temperature, flow can be completely or substantially complete, e.g. only a trickle is allowed, stopped to avoid scalding water exiting the faucet.

To avoid the propagation of bacteria within faucets or other such water supply systems, the system is often disinfected by way of passing high temperature water through the system. Unfortunately, the temperature to perform any disinfecting is well above the standard maximum temperature of 120 degrees Fahrenheit below which it is desired to maintain the water temperature to avoid scalding.

Unfortunately, faucets that include anti-scald devices typically shut-off (or substantially prevent) the flow of water before the water temperature reaches a sufficiently high temperature to effectuate disinfection.

Embodiments of the present invention relate to improvements over the current state of the art.

BRIEF SUMMARY OF THE INVENTION

In one embodiment, an anti-scald device for a fluid supply system, such as a faucet, is provided. The anti-scald device includes a housing and an anti-scald assembly. The housing has a first cavity that includes a hot fluid inlet, a cold fluid inlet and a first cavity outlet. The anti-scald assembly is positioned, at least in part, within the first cavity. The anti-scald assembly has a thermostatic element coupled to a shuttle. The anti-scald assembly is transitionable between a first configuration and a second configuration. In the first configuration, the thermostatic element moves the shuttle relative to the hot fluid inlet between a hot fluid low flow position and a hot fluid high flow position in response to a temperature of fluid within the first cavity to maintain the temperature of the fluid exiting the first cavity through the first cavity outlet at or below a set point temperature. In the second configuration, the thermostatic element is prevented from moving the shuttle relative to the hot fluid inlet to maintain the temperature of the fluid exiting the first cavity below the set point temperature.

In one embodiment, the anti-scald assembly includes a carrier element movably mounted relative to the housing for motion between a first position and a second position. The carrier element operably adjusts a position of the thermostatic element relative to the hot fluid inlet. The carrier element is positioned in the first position when the anti-scald assembly is in the first configuration. The carrier element is positioned in the second position when the anti-scald assembly is in the second configuration.

In one embodiment, the anti-scald assembly is transitioned between the first configuration and the second configuration by transitioning the carrier element between the first and second positions.

In one embodiment, a set point temperature adjustment member is adjustably positionable relative to the carrier element. Adjustment of a position of the set point temperature adjustment member relative to the carrier element adjusts the position of the thermostatic element relative to the carrier element to adjust the set point temperature when the anti-scald assembly is in the first configuration.

In an embodiment, the carrier element is threadedly mounted to the housing for transitioning between the first and second positions. The set point temperature adjustment member is threadedly mounted to the carrier element for adjusting the position of the set point temperature adjustment member relative to the carrier element.

In an embodiment, the housing further comprises a second cavity downstream, at least in part, from the first cavity outlet having a tempered fluid inlet, a cold fluid inlet and a second cavity outlet. The tempered fluid inlet being fluidly coupled to the first cavity outlet such that the fluid exiting the first cavity flows into the second cavity through the tempered fluid inlet. The device further comprising a valve member adjustably positioned within the second cavity for adjusting a flow of a least one of the flow of fluid into the second cavity through the tempered fluid inlet and through the cold fluid inlet to control an outlet temperature of the fluid exiting the anti-scald device.

In an embodiment, the valve member is a tubular mixing barrel that is a tubular member having a tempered fluid aperture formed through a sidewall of the mixing barrel and a cold fluid aperture formed through the sidewall of the mixing barrel. Adjusting the position of the mixing barrel within the second cavity adjusts an alignment of the temperature fluid aperture with the tempered fluid inlet to adjust a flow of fluid into the second cavity through the temperature fluid inlet and adjusts an alignment of the cold fluid aperture with the cold fluid inlet to adjust a flow of fluid into the second cavity through the cold fluid inlet.

In an embodiment, a temperature of the fluid exiting the second cavity through the second cavity does not affect the operation of the thermostatic element.

In an embodiment, in the hot fluid low flow position, no hot water flows into the first cavity.

In an embodiment, in the hot fluid high flow position, cold water does not flow into the first cavity.

In an embodiment, in the first configuration, the thermostatic element additionally moves the shuttle relative to the cold fluid inlet between a cold fluid low flow position and a cold fluid high flow position in response to a temperature of fluid within the first cavity to maintain the temperature of the fluid exiting the first cavity through the first cavity outlet at or below a set point temperature. The cold fluid low flow position corresponds to the hot fluid high flow position and the cold fluid high flow position corresponds to the hot fluid low flow position.

In an embodiment, when in the first configuration, the thermostatic element is positioned relative to the hot fluid inlet such that when fluid within the first cavity is at a temperature above the set point temperature, the thermostatic element will move the shuttle to limit flow of hot fluid through the hot fluid inlet until the temperature of the fluid within the first cavity is at or below the set point temperature. In the second configuration, the thermostatic element is positioned relative to the hot fluid inlet such that when fluid within the first cavity is at a temperature above the set point temperature, the thermostatic element cannot move the shuttle sufficiently far to limit the flow of hot fluid through the hot fluid inlet to reduce the temperature of the fluid within the first cavity is at or below the set point temperature.

In an embodiment, in the second configuration, the temperature of the fluid within first cavity can remain above the set point temperature indefinitely without the thermostatic element being able to transition the shuttle from the hot fluid high flow position.

In an embodiment, when in the second configuration, the temperature of the fluid within first cavity can remain above the set point temperature indefinitely without the thermostatic element being able to transition the shuttle sufficiently far from the hot fluid high flow position toward the hot fluid low flow position to allow the temperature of the fluid within the first cavity to be equal to or below the set point temperature.

In another embodiment, a method of disinfecting a fluid supply system including an anti-scald device as outlined above is provided. The method includes transitioning the anti-scald assembly from the first configuration to the second configuration and passing hot fluid through the first cavity at a temperature greater than the set point temperature.

In one method, the step of transitioning the anti-scald assembly positions the thermostatic element or shuttle relative to the hot fluid inlet such that regardless of the temperature of fluid within the first cavity, the thermostatic element cannot position the shuttle relative to the hot fluid inlet to sufficiently limit flow of hot fluid into the first cavity to reduce the temperature of the fluid within the first cavity to or below the set point temperature.

In one method, the anti-scald assembly includes a carrier element movably mounted relative to the housing for motion between a first position and a second position. The carrier element operably adjusts a position of the thermostatic element relative to the hot fluid inlet. The carrier element is positioned in the first position when the anti-scald assembly is in the first configuration. The carrier element is positioned in the second position when the anti-scald assembly is in the second configuration. The step of transitioning the anti-scald assembly from the first configuration to the second configuration includes moving the carrier element from the first position to the second position.

In one method, moving the carrier element from the first position to the second position includes threadedly moving the carrier element relative to the housing.

In one method, the anti-scald device further comprises a set point temperature adjustment member adjustably positionable relative to the carrier element. Adjustment of a position of the set point temperature adjustment member relative to the carrier element adjusts the position of the thermostatic element relative to the carrier element to adjust the set point temperature when the anti-scald assembly is in the first configuration. Moving the carrier element from the first position to the second position also moves the set point temperature adjustment member relative to the hot fluid inlet but does not adjust the position of the set point temperature adjustment member relative to the carrier element.

In one method, the step of transitioning the anti-scald assembly from the first configuration to the second configuration requires only adjusting the position of at least one component of the anti-scald assembly relative to the hot fluid inlet.

In another embodiment, an anti-scald device for a fluid supply system is provided. The device includes a housing having a first cavity including a hot fluid inlet, a cold fluid inlet and a first cavity outlet through which fluid exits the first cavity and a second cavity including a tempered fluid inlet, a cold fluid inlet and a second cavity outlet through which fluid exits the second cavity. The tempered fluid inlet is in fluid communication with the first cavity outlet such that fluid exiting the first cavity through the first cavity outlet flows into the second cavity through the tempered fluid inlet. The device further includes an anti-scald assembly positioned, at least in part, within the first cavity. The anti-scald assembly having a thermostatic element coupled to a shuttle. The thermostatic element moves the shuttle relative to the hot fluid inlet between a hot fluid low flow position and a hot fluid high flow position in response to a temperature of fluid within the first cavity to maintain the temperature of the fluid exiting the first cavity through the first cavity outlet at or below a set point temperature. The device further includes a valve member adjustably positioned within the second cavity for adjusting a flow of a least one of the flow of fluid into the second cavity through the tempered fluid inlet and through the cold fluid inlet to control an outlet temperature of the fluid exiting the anti-scald device.

In one embodiment, the valve member is a tubular mixing barrel that is a tubular member having a tempered fluid aperture formed through a sidewall of the mixing barrel and a cold fluid aperture formed through the sidewall of the mixing barrel. Adjusting the position of the mixing barrel within the second cavity adjusts a temperature of a fluid exiting the second cavity outlet by adjusting an alignment of the temperature fluid aperture with the tempered fluid inlet to adjust a flow of fluid into the second cavity through the temperature fluid inlet and an alignment of the cold fluid aperture with the cold fluid inlet to adjust a flow of fluid into the second cavity through the cold fluid inlet.

In one embodiment, the flow of fluid through the second cavity outlet does not directly affect the thermostatic element of the anti-scald assembly.

In one embodiment, the tempered fluid aperture has a varying cross-section when moving angularly about a rotational axis of the mixing barrel. The cold fluid aperture has a varying cross-section when moving angularly about a rotational axis of the mixing barrel.

In one embodiment, the tempered fluid aperture increases in dimension when moving angularly in a first direction about the rotational axis and the cold fluid aperture increases in dimension when moving angularly in a second direction, opposite the first direction, about the rotational axis.

In one embodiment, the valve member allows for adjusting the outlet temperature to a temperature below the set point temperature by a user, not a service technician.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION OF THE INVENTION

Figure 1:
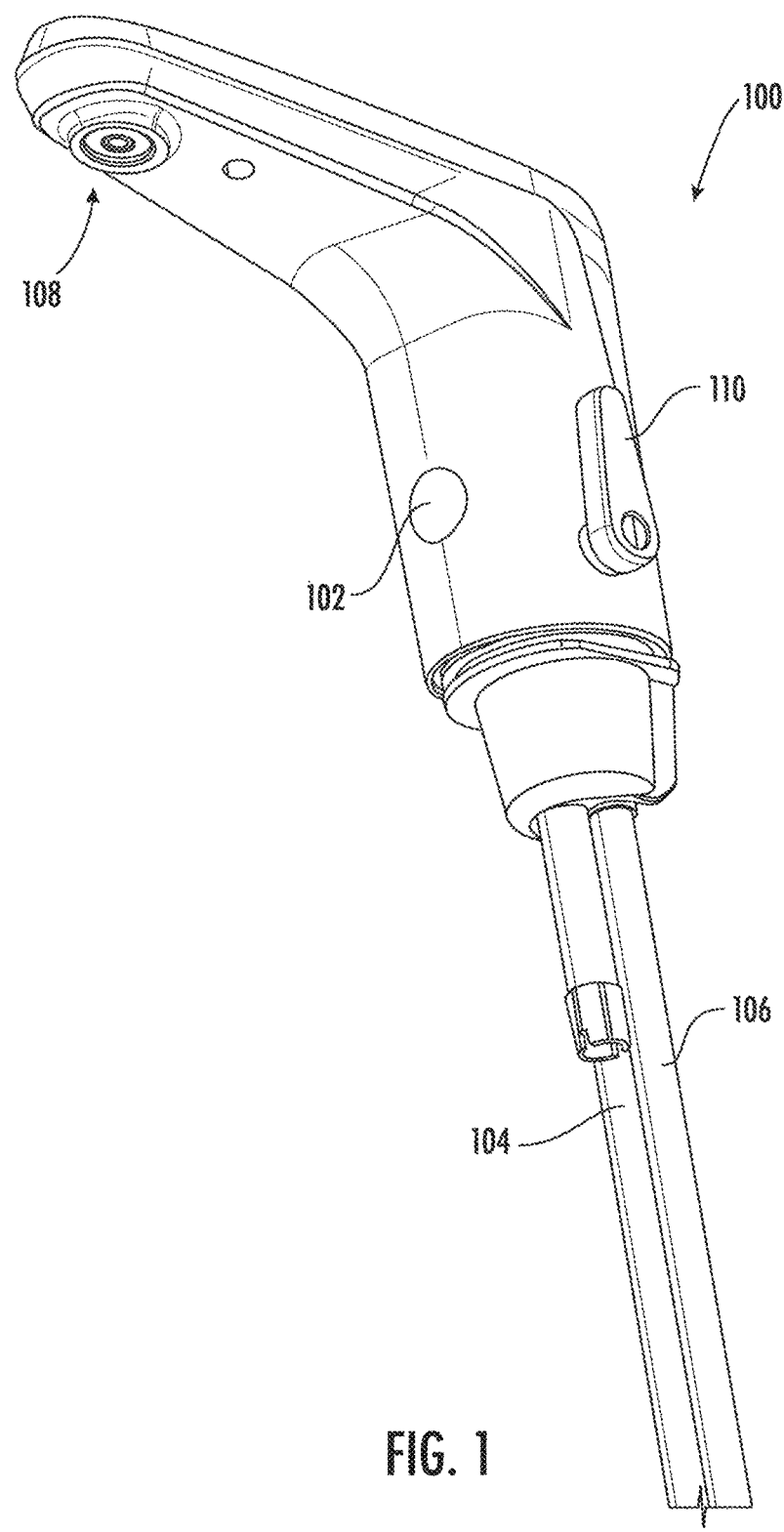
FIG. 1 is a perspective illustration of a faucet according to an embodiment of the invention.

FIG. 1 illustrates a water supply system in the form of a faucet 100 for dispensing water according to an embodiment of the present invention. The faucet 100 is illustrated as an electronically activated faucet that automatically turns on by way of sensor 102. However, faucets that have manual activation could be incorporated.

The faucet 100 is operably attached to a hot water supply 104 and a cold water supply 106. The faucet 100 will operably control the flow of hot water and cold water as it flows therethrough to control the temperature of water exiting outlet 108. As will be described in more detail, the faucet 100 includes anti-scald features to prevent the temperature of the water exiting the faucet 100 from exceeding a set point temperature (also referred to as a maximum outlet temperature) to prevent scalding of a user. Typically this set point/maximum temperature is 120 degrees Fahrenheit or less.

While the faucet 100 may be configured to prevent exceeding that set point temperature, the illustrated faucet 100 includes the ability for the user to adjust the temperature downward from the set point temperature by manually manipulating handle 110. It is noted that this does not allow the user to adjust the set point/maximum temperature. Other options of adjusting the temperature are contemplated that do not include handle such as electronic temperature adjustment.

Figure 8:
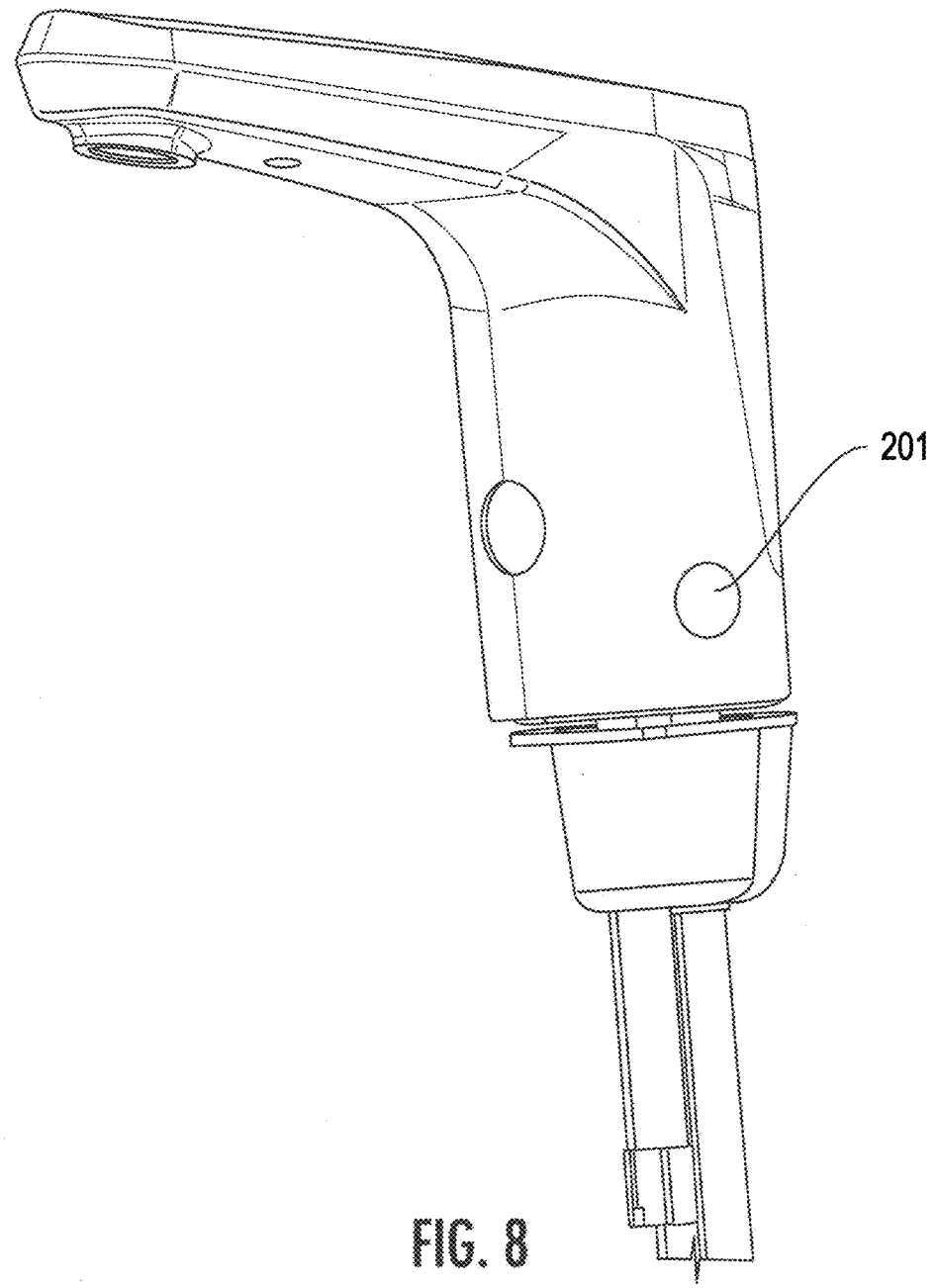
FIGS. 8 and 9 illustrate an alternative embodiment that does not have an external handle to allow a user to adjust a desired temperature below a set point temperature While the invention will be described in connection with certain preferred embodiments, there is no intent to limit it to those embodiments. On the contrary, the intent is to cover all alternatives, modifications and equivalents as included within the spirit and scope of the invention as defined by the appended claims.
Figure 9:
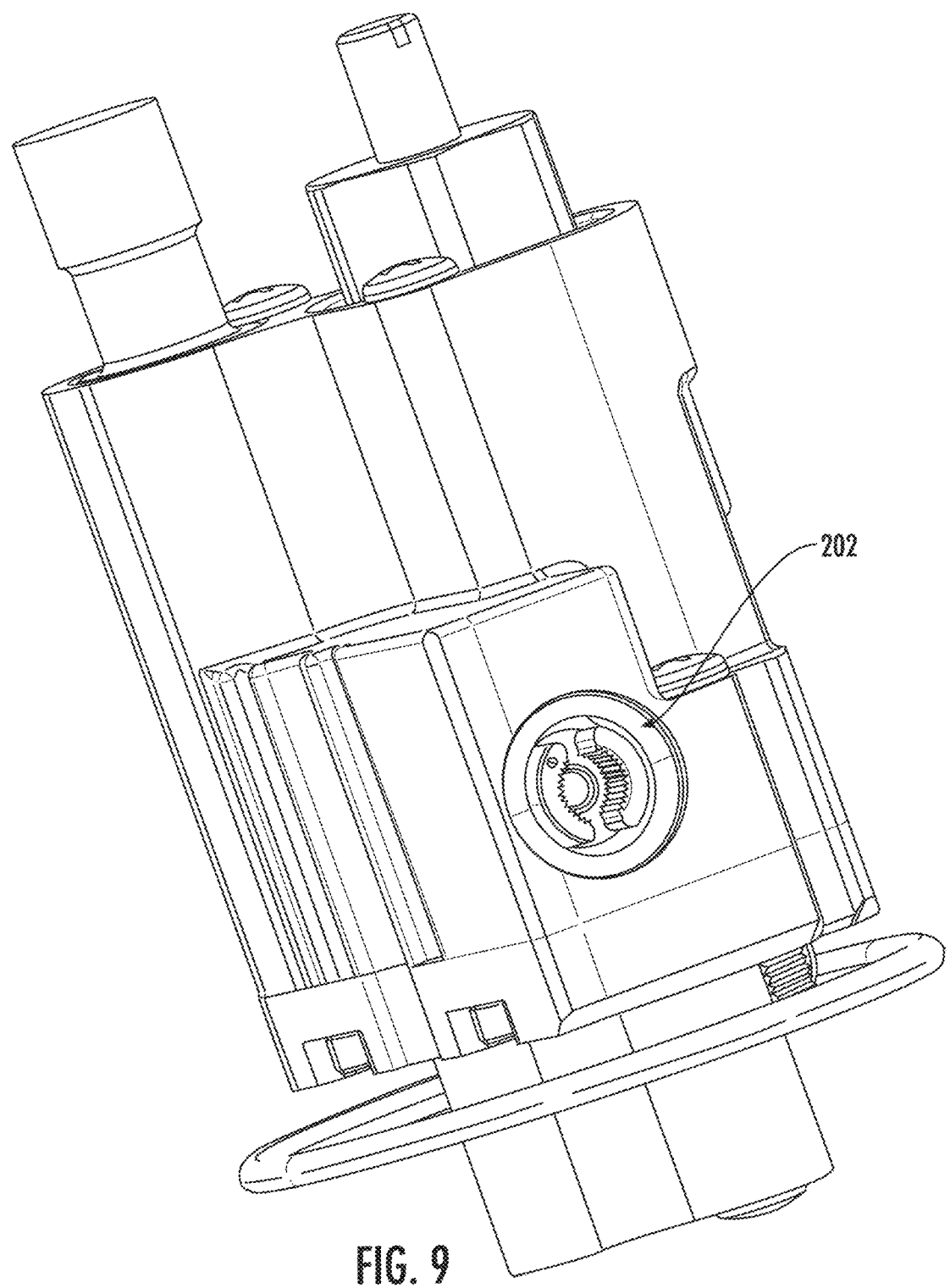

In some embodiments, the device for adjusting temperature may be concealed, see e.g. FIGS. 8 and 9). A cap 200 can be provided that is removable to provide access to the device 202 for adjusting the temperature. A technician can remove the cap and use a tool to adjust the mechanism that controls the temperature, e.g. by way of a screw driver, wrench or other tool. However, this additional temperature adjustment is optional and the ability for the user to adjust the temperature may be omitted.

Figure 2:
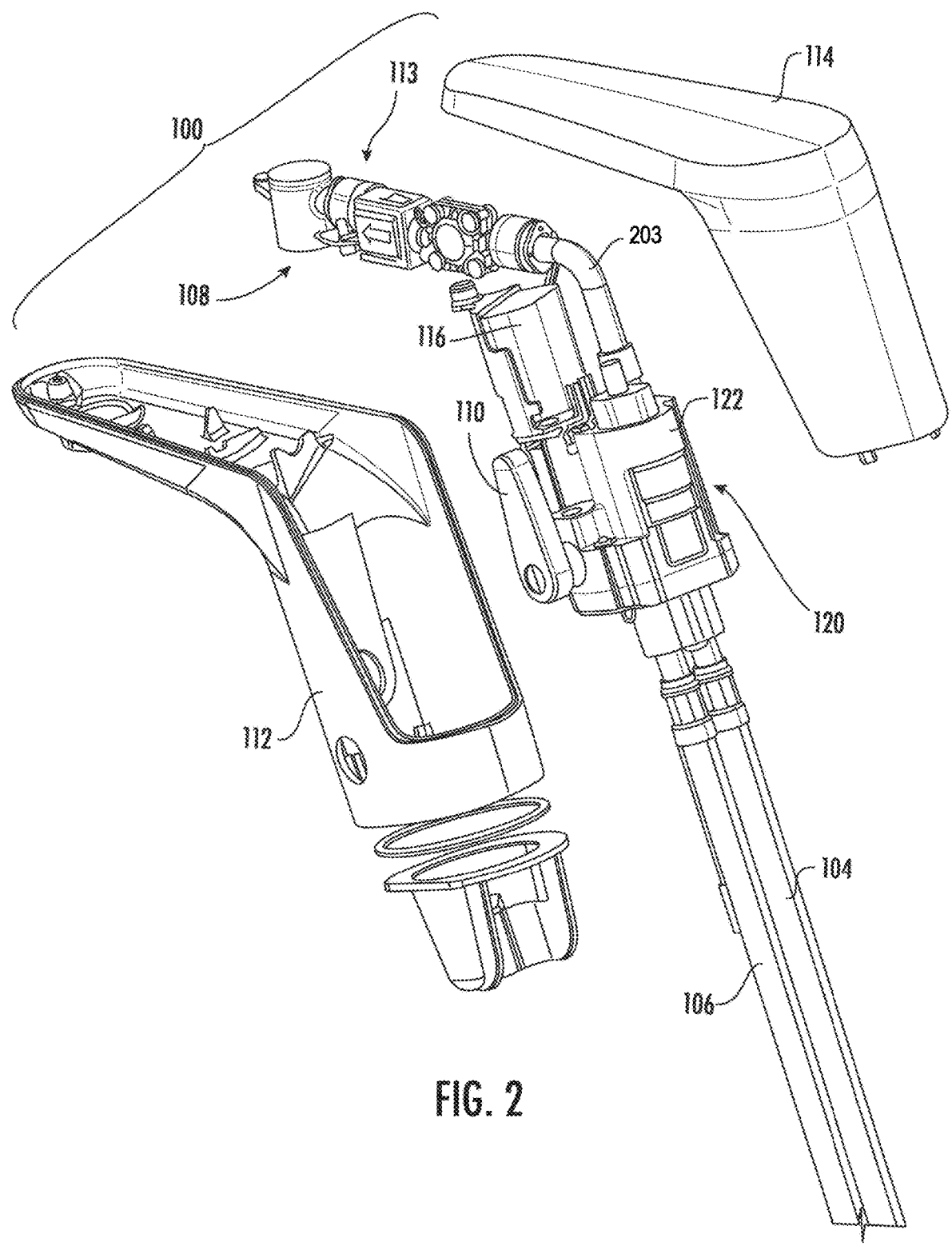
FIG. 2 is a partial exploded illustration of the faucet of FIG. 1.

FIG. 2 is a partially exploded illustrate of the faucet 100. The faucet generally includes an outer shell, which in this embodiment is formed from first and second shell portions 112, 114. The outer shell provides the aesthetic appearance of the faucet 100 and houses the internal operating components that provide for temperature regulation as well as turning on and off the flow of water.

As noted above, this embodiment is an electronically activated faucet. As such, the faucet 100 includes a solenoid valve 113 for turning on and off the faucet 100 to allow or prevent any flow of water to outlet 108 in response to sensor 102. A battery 116 operably powers sensor 102 and solenoid valve 113. Alternative power supplies are contemplated as well including AC power. Again, other devices, such as manual valves, for activating water flow could be implemented.

An anti-scald device 120 is interposed between the solenoid valve 113 and the hot and cold water supplies 104, 106 to regulate the water temperature of water exiting the faucet.

Figure 3:
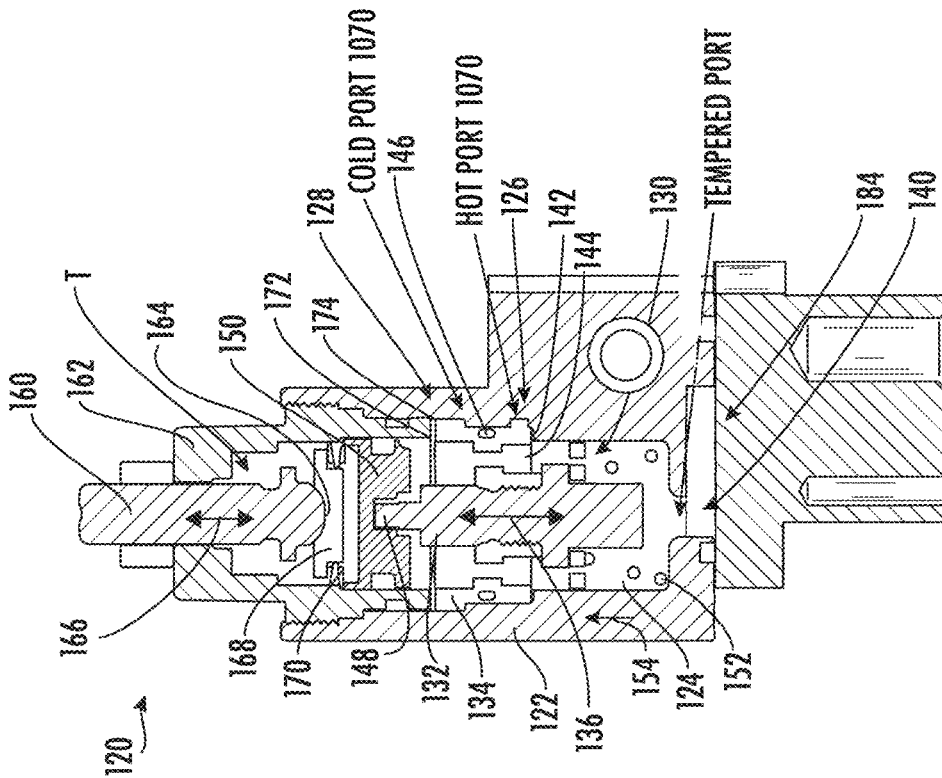
FIG. 3 is a partial cross-sectional illustration of an anti-scald device of the faucet of FIG. 1.

With additional reference to FIG. 3, the anti-scald device 120 includes a housing 122 that defines, at least in part, a first cavity 124. The first cavity 124 has a hot fluid inlet 126 and a cold fluid inlet 128. The hot fluid inlet 126 is fluidly connected to the hot water supply 104 by an internal passage defined by housing 122. The cold fluid inlet 128 is fluidly connected to the cold water supply 106 by an internal passage defined by the housing 122.

Anti-scald assembly 130 is positioned, at least in part, within the first cavity 124. The anti-scald assembly 130 includes a thermostatic element 132 coupled to a shuttle 134. The thermostatic element 132 is operably responsive to the temperature of the fluid within the first cavity 124. The thermostatic element 132 may be considered to be a sensor because of this. The thermostatic element 132 could take many forms such as by non-limiting example wax elements or bimetallic elements as are well known in the art. In the illustrated embodiment, the thermostatic element 132 is a wax element that expands as the temperature of the fluid surrounding the thermostatic element 132 increases. It is noted that these thermostatic elements are often also referred to as thermostatic motors.

When the thermostatic element 132 extends or contracts due to changes in temperature of the fluid surrounding the thermostatic element 132, the thermostatic element 132 drives the shuttle 134 represented by arrow 136. In this embodiment, motion of the shuttle is axially back and forth however other configurations are contemplated where a shuttle or valve member is rotated rather than driven axially.

The motion of the shuttle 134 operably adjusts the flow of fluid through, at a minimum, the hot water inlet 126 and into first cavity 124. In this embodiment, the shuttle 134 also adjusts the flow of cold fluid through the cold water inlet 128 and into the first cavity 126. By adjusting the relative flows of hot water and cold water through the corresponding inlets 126, 128 and into first cavity 124, the fluid exiting the first cavity 124 (typically a mixture hot and cold water) through a first cavity outlet 140 (also referred to as a tempered port) can be maintained at or below a set point temperature.

Typically, the temperature can be maintained at a substantially constant value provided that the hot water is at or above the set point temperature and the cold water is below the set point temperature.

During normal operation, the anti-scald assembly is configured such that the thermostatic element 132 and shuttle 134 are positioned within the first cavity relative to the hot water inlet 126 and cold water outlet 128 that if the temperature of the fluid exiting through first cavity outlet 140 cannot be maintained below the temperature set point, the thermostatic element 132 will drive the shuttle 134 such that it substantially shuts off or significantly reduces the flow of hot water into the first cavity 124. For non-limiting example, a significant reduction of flow could be a flow rate that is twenty five (25) percent of max flow, or less. In this embodiment, an end 142 of the shuttle 134 will be driven towards, and preferably, into contact with a shelf 144 formed by the housing 122 to limit or prevent fluid flow between the housing 122 and the shuttle 134. A gasket 146 carried by shuttle 134 is positioned between the shuttle 134 and the housing on an opposite side of the hot water inlet 126 to facilitate limiting or stopping the hot water flow into the first cavity 124. By limiting or stopping the hot water flow, the temperature of water than can ultimately be dispensed by the faucet 100 is maintained below the set point temperature and scalding of a user can be prevented.

Preferably, when the hot water flow is stopped or limited, cold water flow is maintained so that the time to allow the thermostatic element 132 to drive the shuttle 134 away from shelf 144 is reduced because the temperature of the water within the first cavity 124 must dissipate to cause contraction of the thermostatic element 132. Otherwise, the resetting process could take a long time if the heat must simply dissipate through the rest of the components of the faucet. This can be exacerbated if many of the components forming/surrounding the first cavity 124 are formed from thermally insulating materials such as plastic.

In this embodiment, a first end of the thermostatic element 132 abuts against a spring retainer 150. A first spring 152 operably acts between the housing 122 and the thermostatic element 132 to operably bias the thermostatic element 132 towards spring retainer 150 as illustrated by arrow 154. When the thermostatic element 132 expands due to increase in fluid temperature, the thermostatic element 132 will compress first spring 152 as shuttle 134 is driven towards shelf 144. As fluid temperature within cavity 124 drops and thermostatic element 132 contracts, first spring 152 will again, bias the thermostatic element 132 and shuttle 134 in a direction illustrated by arrow 154, e.g. the shuttle 134 will be biased towards opening or permitting fluid flow through the hot water inlet 126. Similarly, this will bias the shuttle 134 towards reducing cold water flow through the cold water inlet 128.

In this embodiment, the temperature set point can be adjusted by way of a set point temperature adjustment member in the form of an adjustment stem 160. The adjustment stem 160 is carried by a carrier member in the form of cap 162 that closes the first cavity 122 of the housing 120. In this embodiment, cap 162 forms part of first cavity 124. The adjustment stem 160 is threadedly mounted to cap 162 so that the axial position of an end 164 of the adjustment stem 160 relative to housing 122 and relative to the first cavity 124 can be adjusted illustrated by arrow 166. Adjustment of the position of adjustment stem 160 operably adjusts the set point temperature around which the thermostatic element 132 and shuttle 134 operate.

By changing the axial position of the adjustment stem 160, the position of the thermostatic element 132 and the coupled shuttle 134 within the first cavity 124 and relative to the hot and cold water inlets 126, 128. If the adjustment stem 160 is moved axially outward, e.g. in a direction corresponding to arrow 154, the set point temperature is increased because the thermostatic element 132 and shuttle 134 are moved further away from shelf 144 such that an increased amount of extension of the thermostatic element 132 (e.g. an increased fluid temperature) is required to reduce the flow of hot water through hot water inlet 126. If the adjustment stem 160 is moved axially inward, e.g. in a direction opposite to arrow 154, the set point temperature is decreased because the thermostatic element 132 and shuttle 134 are moved closer to shelf 144 such that a decreased amount of extension of the thermostatic element 132 (e.g. lower fluid temperature) is required to reduce the flow of hot water through hot water inlet 126.

It is noted that further adjustment of the anti-scald assembly 130 can be effectuated by adjustment of the position of the shuttle 134 relative to thermostatic element 132 by way of a threaded connection between the shuttle 134 and the thermostatic element 132. However, set point temperature adjustment using adjustment stem 160 does not require a technician to take apart the anti-scald device 130.

In this embodiment, the adjustment stem 160 does not directly act on the thermostatic element 132. Instead, the adjustment stem 160 acts on spring actuator 168. A second spring 170 is axially interposed between spring actuator 168 and spring retainer 150. The second spring 170 operably opposes first spring 152 and biases the spring retainer 150 towards the thermostatic element 132 in a direction opposite arrow 154. While a separate spring actuator 168 is provided that is in axial contact with end 164 of adjustment stem 160, in other embodiments, this component could be simply provided by adjustment stem 160.

It is a feature of the illustrated embodiment that the anti-scald device can be transitioned between first and second configurations. The first configuration has been described above where the anti-scald device 130 can control fluid flow to be maintained below a desired temperature set point. The temperature set point is below a scald temperature, typically, less than 120 degrees Fahrenheit. Unfortunately, this prevents thermal disinfecting the internal flow passages of the faucet 100. To perform thermal disinfection, the temperature is preferably above 150 degrees Fahrenheit and more preferably above 158 degrees Fahrenheit. The flow of hot water above this temperature may occur in excess of thirty (30) minutes and can, in some instances, extend beyond three (3) hours. Due to the anti-scald device 130, in normal operation, this temperature cannot be reached as the thermostatic element 132 would drive the shuttle 134 to shut off hot water flow while allowing cold water flow to prevent such a temperature of the fluid within and exiting the first cavity 124.

The faucet can be transitioned to a second configuration that allows a technician, regardless of the inclusion of the thermostatic element 132, to permit hot water to flow through the system at an appropriate temperature for disinfecting. Preferably, in the second configuration, the temperature of the fluid can remain above the set point temperature at a disinfecting temperature for an indefinite amount of time so that disinfection can occur.

In the second configuration, the thermostatic element 132 is prevented from sufficiently, if at all, moving the shuttle 134 relative to the hot fluid inlet 126 to maintain the temperature of the fluid exiting the first cavity 124 via the first cavity outlet 140 below the temperature set point.

Figure 7:
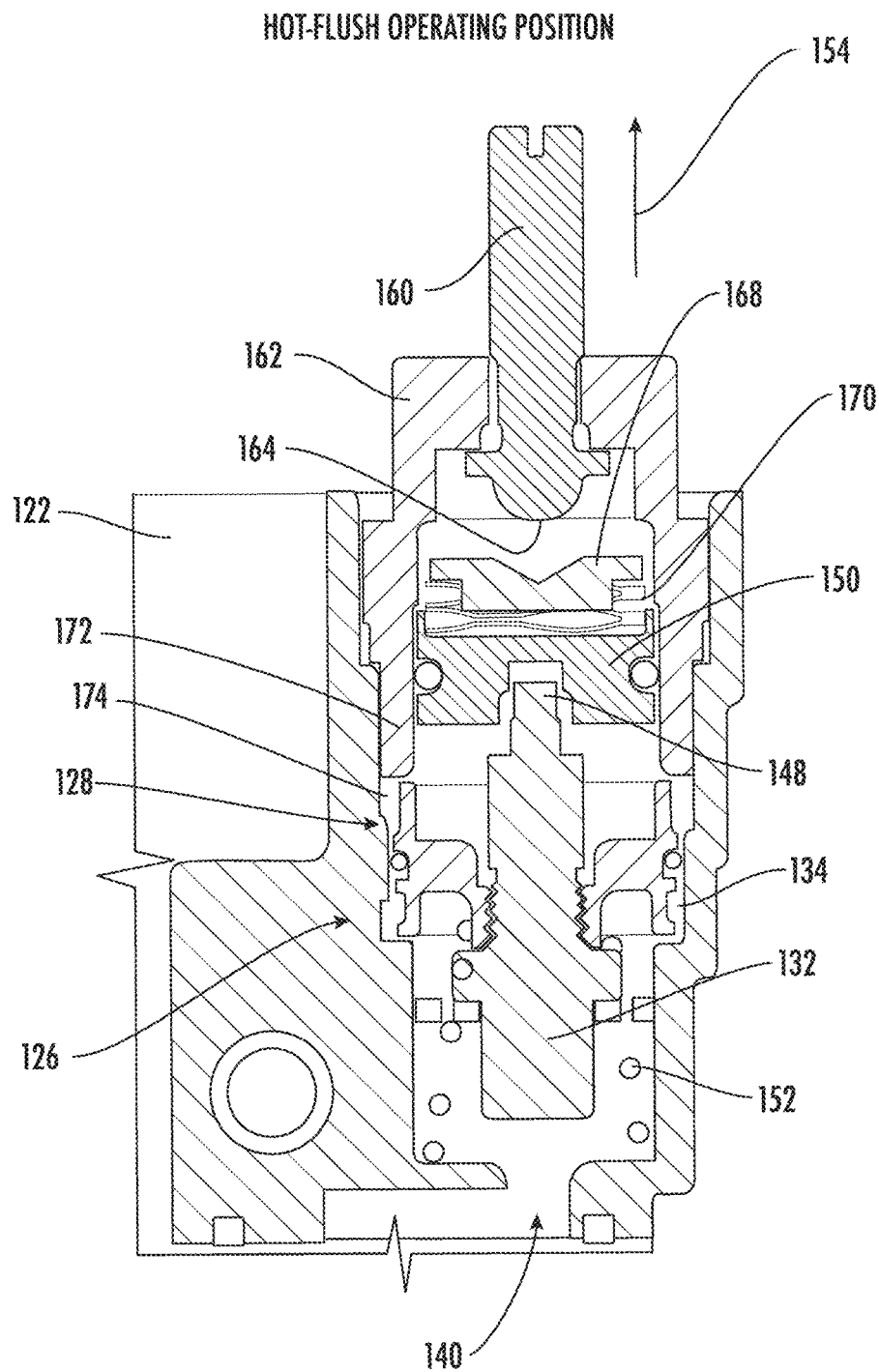
FIG. 7 is a cross-sectional illustration of the anti-scald device illustrated in a second configuration that allows for hot water above a set point temperature to flow through the system

With additional reference to FIG. 7, to transition from the first configuration to the second configuration, in one way, the adjustment stem 160 is threaded sufficiently far outward, e.g. in the direction illustrated by arrow 154, such that regardless of the amount of extension of the thermostatic element 132, it will not provide sufficient force, if any, against spring retainer 150 to drive the shuttle 134 towards closing off the hot water inlet 126. To do this, the adjustment stem 160 and cap 162 must be configured to provide adjustment stem 160 with sufficient travel T. When the adjustment stem 160 is threaded in the direction illustrated by arrow 154, first spring 152 will push thermostatic element 132 and shuttle 134 in the same direction. Typically, in this second configuration, end 172 of shuttle 134 will be pushed axially into abutment with end 174 of cap 162 thereby limiting or stopping the flow of cold water through cold water inlet 128, similar to how the hot water was limited or stopped as discussed above, while allowing full hot water flow through hot water inlet 126 regardless of the temperature of the fluid within and exiting the first cavity 124.

In this second configuration, regardless of the amount of extension of the thermostatic element 132, it will be insufficient to sufficiently displace spring retainer 150, spring 170, spring actuator 168 such that it will sufficiently contact adjustment stem 160 to provide sufficient force to the thermostatic element to counteract the biasing force of spring 152 to allow the shuttle 134 to be driven to close off or limit flow through the hot water inlet 126.

In an alternative method, rather than transitioning the adjustment stem 160 relative to cap 162, the position of cap 162 could be axially adjusted relative to housing 122. One benefit of this configuration is that the position of the adjustment stem 160 relative to cap 162 does not change such that it may be easier for a technician to return the anti-scald device to the desired set point temperature when transitioning back to the first configuration.

Again, in this second method, when axially moving the cap 162, it must be moved axially in the direction illustrated by arrow 154 a sufficient distance such that extension of the thermostatic element 132 will not sufficiently actuate the shuttle 134 towards its position where it closes off or limits flow through the hot water inlet 126. As such, transitioning between the first and second configurations of the anti-scald device 130 can be effectuated by moving the cap 162, and consequently stem 160, between first and second positions. Similar to before, the cap 162 can be threaded to housing 122 such that threading can effectuate this motion.

In the illustrated embodiment, transitioning between the anti-scald configuration as well as the thermal disinfecting configuration as well as adjusting the set point temperature requires partial disassembly of the faucet 100 to provide access to the adjustment stem 160 and/or the cap 162. This is because in some embodiments, such as those used in public or commercial, e.g. not in private homes, the person actually using the faucet 100 to get water, such as to wash their hands, will not be able to adjust the set point temperature or transition to the second configuration where the scald prevention features are not in operation. However, a service technician would be able to make these adjustments. However, embodiments where the faucet, e.g. shell thereof, need not be taken apart to make these adjustments are contemplated.

While the set point temperature and transitioning between the anti-scald and disinfecting configurations is preferably not permitted by the typical user (e.g. not a technician), the illustrated embodiment of the faucet 100 does allow for a user to provide some limited adjustment to the outlet temperature of the water ultimately exiting the faucet through outlet 108. As noted above, the faucet 100 includes handle 110 that allows a user to perform this adjustment. This adjustment is limited to adjusting the temperature downward from the set point temperature and does not allow the user to adjust the outlet temperature above the set point temperature.

Figure 4:
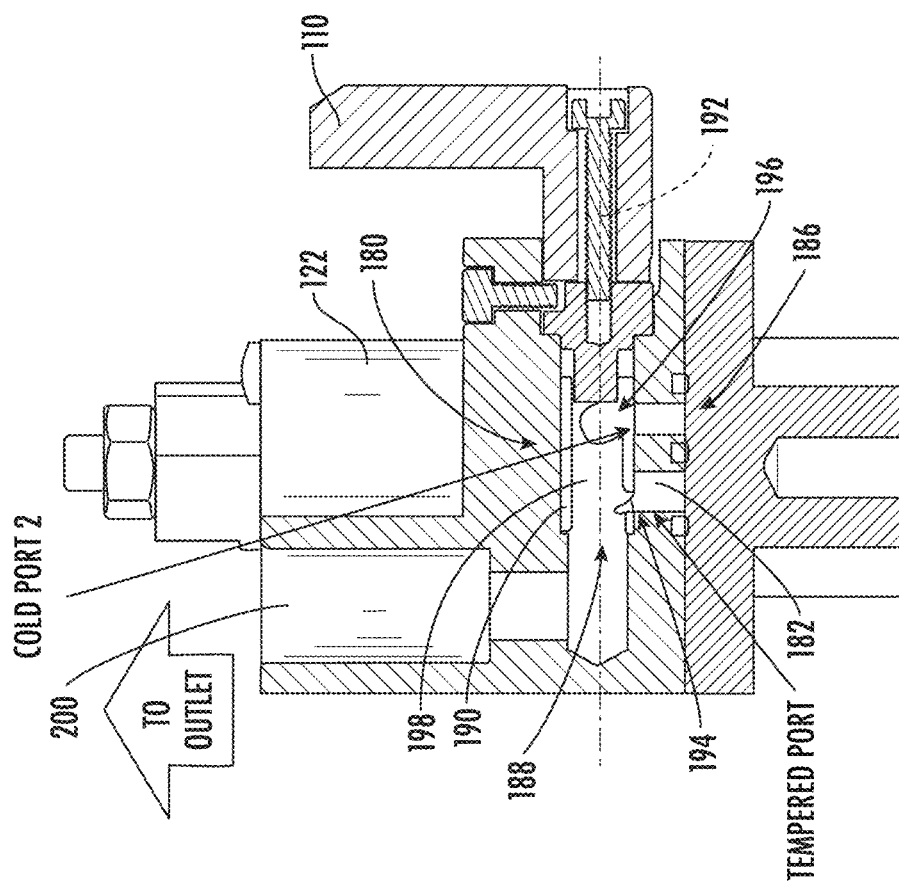
FIG. 4 is a further cross-sectional illustration of an anti-scald device of the faucet of FIG. 1.
Figure 5:
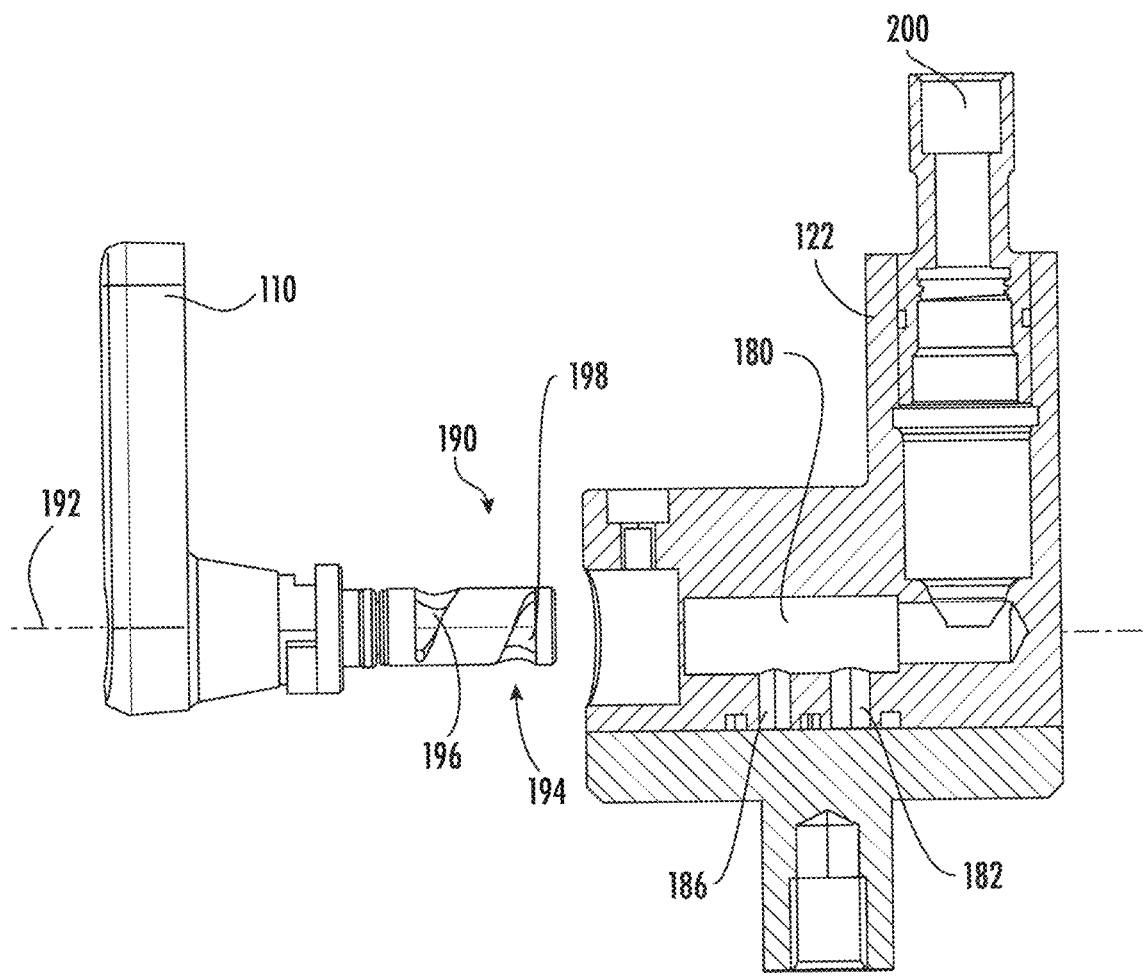
FIG. 5 is a partial exploded and cross-sectional illustration of the anti-scald device of the faucet of FIG. 1.
Figure 6:
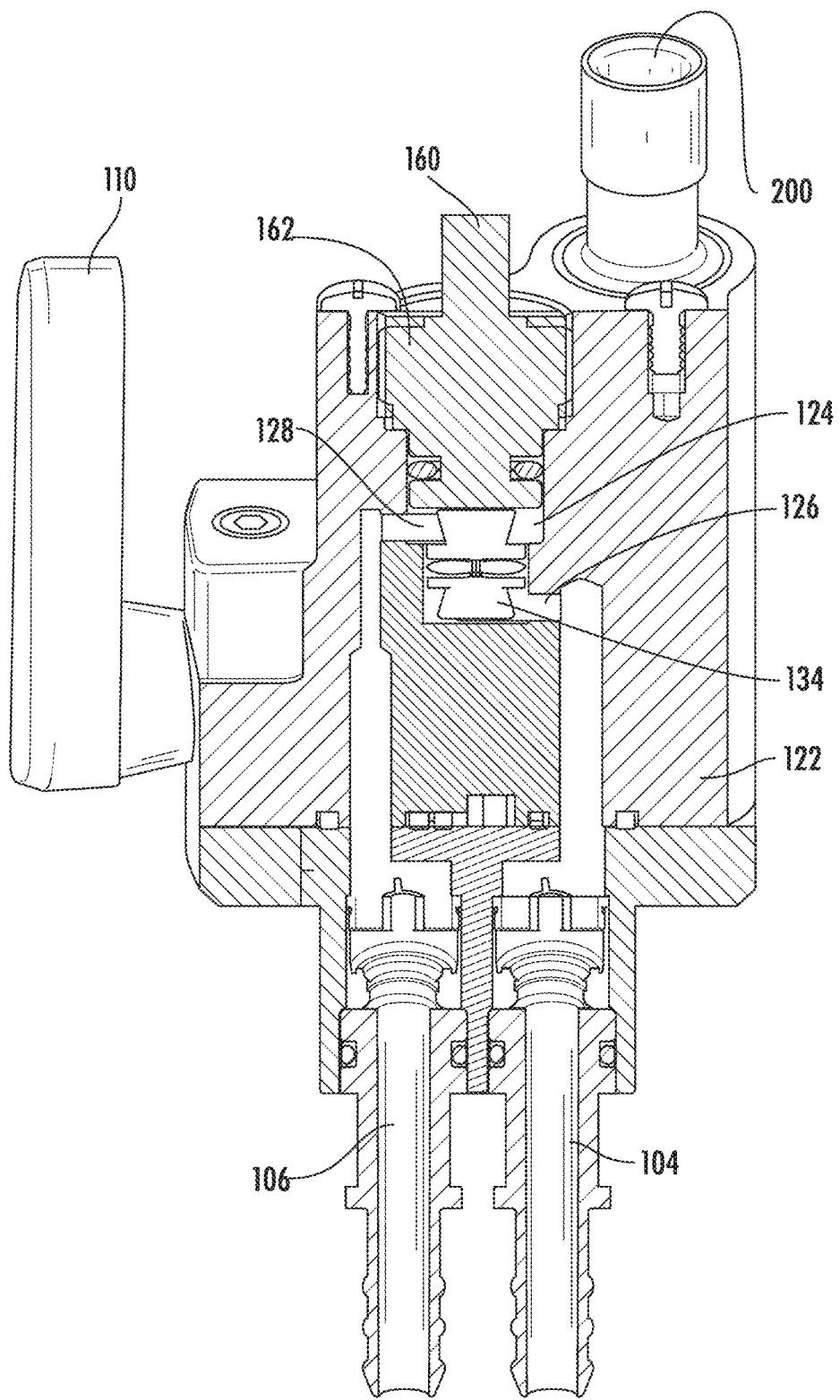
FIG. 6 is cross-sectional illustration of the anti-scald device of the faucet of FIG. 1.
Figure 6B:
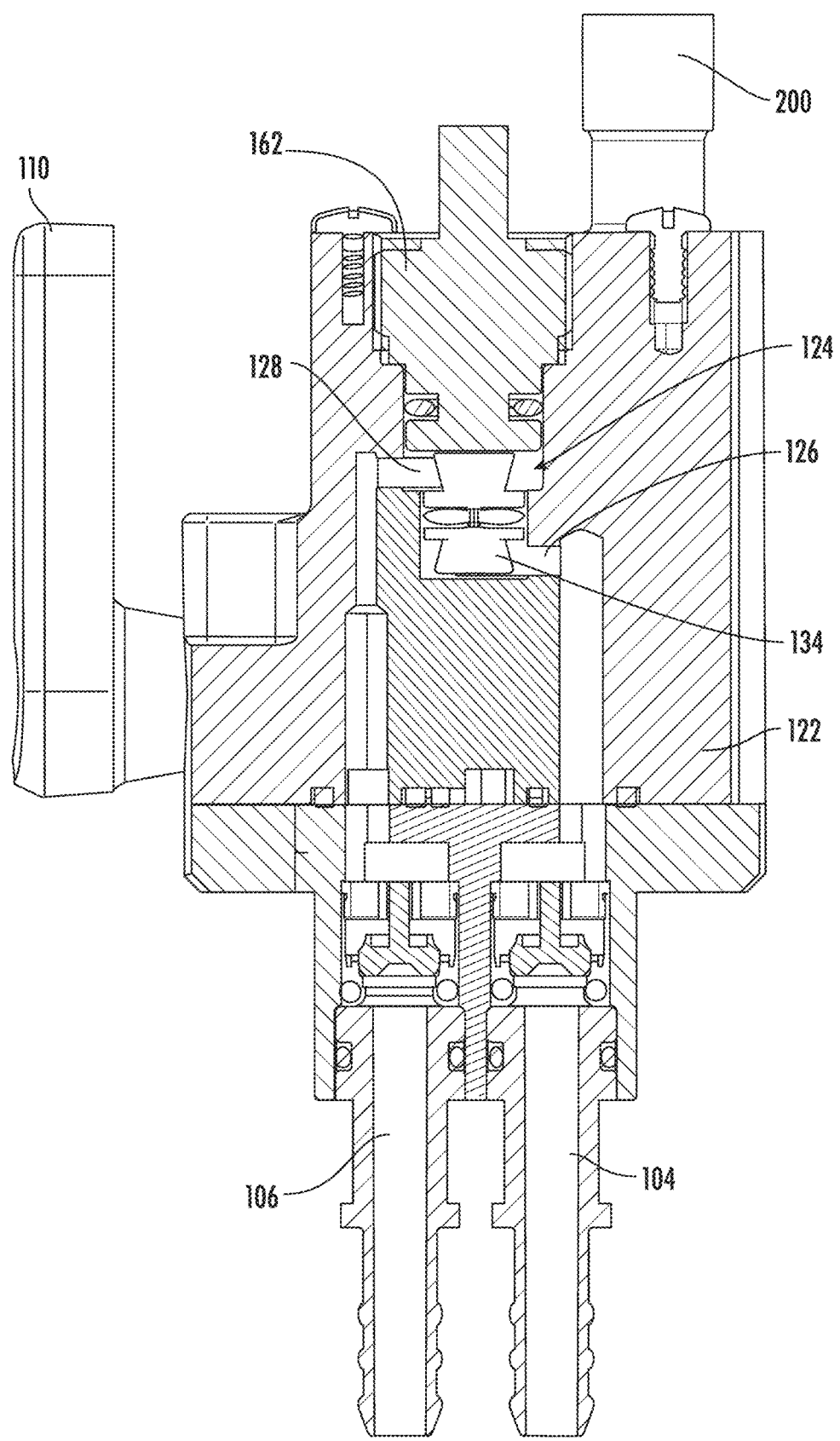

With additional reference to FIGS. 4 and 5, to allow for user adjustment of the outlet temperature of the fluid exiting the faucet, a second cavity 180 is provided in housing 122. This second cavity 122 is downstream from the first cavity outlet 140. The second cavity 122 includes a tempered fluid inlet 182 that is fluidly connected to the first cavity outlet 140 by an internal flow passage 184 of housing 122. The second cavity 122 includes a second cold water inlet 186 that is operably in fluid communication with the cold water supply 106. Additionally, a second cavity outlet 188 is provided.

The fluid exiting the first cavity 124 will also be referred to as tempered water.

A mixing barrel 190 within the second cavity 180 is operably affixed to handle 110 for rotation about axis 192 upon actuation of handle 110. The mixing barrel 190 is a tubular element that selectively cooperates with the tempered fluid inlet 182 and second cold water inlet 186 to selectively adjust the amount of tempered water flow through tempered fluid inlet 182 and cold water flow through second cold water inlet 186 so that the user can selectively adjust the outlet temperature of the water.

In this embodiment, the mixing barrel 190 includes a pair of openings 194, 196 extending through the tubular sidewall of the mixing barrel. The openings 194, 196 have varying cross-section when moving angularly about axis 192 such that the flow of fluid through the openings 194, 196 of the fluid supplied at the corresponding inlets 182, 186 can be adjusted by adjusting the alignment of the openings 194, 196 relative to inlets 182, 186. This allows the user to adjust the ratio of tempered water to cold water so as to adjust the outlet temperature to a desired temperature. Again, this will be at most equal to the set point temperature.

Mixing of the tempered water and cold water can occur within the internal cavity 198 defined by the tubular sidewall of the mixing barrel.

With reference to FIGS. 2 and 4, an outlet 200 of housing 122 downstream from the second cavity 188 and mixing barrel 190 is coupled to solenoid 114 by a tube 202.

As such, in this embodiment, the actual temperature of the fluid exiting faucet 108 is not applied to the thermostatic element 132 because of the inclusion of the second cavity 180 and the addition of cold water to the tempered water that has already passed through the first cavity 124 in which the thermostatic element 132 is located.

When disinfection is desired, the following steps can occur. A technician can shut off cold water and hot water provided to the faucet 100. The faucet 100 can be activated to drain as much remaining water remaining in the faucet 100 as possible. In this device, it would be done electronically. However, this could be done manually.

The hot water input temperature is raised to a proper temperature.

The system can then be transitioned to the second configuration. This can be done by properly adjusting the position of at least one or both of the adjustment stem 160 or cap 162 so that the thermostatic element 132 cannot sufficiently displace shuttle 134 to stop or limit flow of hot water.

The hot water that was previously turned off is turned on to raise the temperature of the faucet above the desired disinfecting temperature. This flow of hot water can extend in excess of thirty minutes and in some systems in excess of three hours. During the disinfecting process, the cold water remain turned off such that there isn't a flow of cold water into the faucet 100. Check valves may be present within the cold water supply lines to prevent undesired backflow.

In an alternative disinfecting system, the hot water may have a second internal conduit that is selectively connected to the cold water conduits within the faucet. Hot water is then allowed to flow directly through some of the cold water passages within the faucet during the disinfecting process. Once the disinfecting process is over, the hot water would be disconnected from the cold water passages, e.g. by way of closing a separate valve.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An anti-scald device for a fluid supply system comprising:
    a housing having a first cavity, the first cavity including a hot fluid inlet, a cold fluid inlet and a first cavity outlet;
    an anti-scald assembly positioned, at least in part, within the first cavity, the anti-scald assembly having a thermostatic element coupled to a shuttle, the anti-scald assembly transitionable between a first configuration and a second configuration;
    in the first configuration, the thermostatic element moves the shuttle relative to the hot fluid inlet between a hot fluid low flow position and a hot fluid high flow position in response to a temperature of fluid within the first cavity to maintain the temperature of the fluid exiting the first cavity through the first cavity outlet at or below a set point temperature; and
    in the second configuration, the thermostatic element is prevented from moving the shuttle relative to the hot fluid inlet to maintain the temperature of the fluid exiting the first cavity below the set point temperature.

2. The device of claim 1, wherein the anti-scald assembly includes a carrier element movably mounted relative to the housing for motion between a first position and a second position, the carrier element operably adjusting a position of the thermostatic element relative to the hot fluid inlet;
    the carrier element being positioned in the first position when the anti-scald assembly is in the first configuration; and
    the carrier element being positioned in the second position when the anti-scald assembly is in the second configuration.

3. The device of claim 2, wherein the anti-scald assembly is transitioned between the first configuration and the second configuration by transitioning the carrier element between the first and second positions.

4. The device of claim 2, further comprising a set point temperature adjustment member adjustably positionable relative to the carrier element, whereby adjustment of a position of the set point temperature adjustment member relative to the carrier element adjusts the position of the thermostatic element relative to the carrier element to adjust the set point temperature when the anti-scald assembly is in the first configuration.

5. The device of claim 4, wherein:
    the carrier element is threadedly mounted to the housing for transitioning between the first and second position; and
    the set point temperature adjustment member is threadedly mounted to the carrier element for adjusting the position of the set point temperature adjustment member relative to the carrier element.

6. The device of claim 1, wherein the housing further comprises a second cavity downstream, at least in part, from the first cavity outlet having a tempered fluid inlet and a cold fluid inlet and a second cavity outlet; the tempered fluid inlet being fluidly coupled to the first cavity outlet such that the fluid exiting the first cavity flows into the second cavity through the tempered fluid inlet;
    further comprising a valve member adjustably positioned within the second cavity for adjusting a flow of a least one of the flow of fluid into the second cavity through the tempered fluid inlet and through the cold fluid inlet to control an outlet temperature of the fluid exiting the anti-scald device.

7. The device of claim 6, wherein the valve member is a tubular mixing barrel that is a tubular member having a tempered fluid aperture formed through a sidewall of the mixing barrel and a cold fluid aperture formed through the sidewall of the mixing barrel, wherein adjusting the position of the mixing barrel within the second cavity adjusts an alignment of the temperature fluid aperture with the tempered fluid inlet to adjust a flow of fluid into the second cavity through the temperature fluid inlet and adjusts an alignment of the cold fluid aperture with the cold fluid inlet to adjust a flow of fluid into the second cavity through the cold fluid inlet.

8. The device of claim 7, wherein a temperature of the fluid exiting the second cavity through the second cavity does not affect the operation of the thermostatic element.

9. The device of claim 1, wherein in the hot fluid low flow position, no hot water flows into the first cavity.

10. The device of claim 9, wherein in the hot fluid high flow position, cold water does not flow into the first cavity.

11. The device of claim 1, wherein in the first configuration, the thermostatic element moves the shuttle relative to the cold fluid inlet between a cold fluid low flow position and a cold fluid high flow position in response to a temperature of fluid within the first cavity to maintain the temperature of the fluid exiting the first cavity through the first cavity outlet at or below a set point temperature, the cold fluid low flow position being the same as the hot fluid high flow position and the cold fluid high flow position being the same as the hot fluid low flow position.

12. The device of claim 1, wherein:
when in the first configuration, the thermostatic element is positioned relative to the hot fluid inlet such that when fluid within the first cavity is at a temperature above the set point temperature, the thermostatic element will move the shuttle to limit flow of hot fluid through the hot fluid inlet until the temperature of the fluid within the first cavity is at or below the set point temperature;
when in the second configuration, the thermostatic element is positioned relative to the hot fluid inlet such that when fluid within the first cavity is at a temperature above the set point temperature, the thermostatic element cannot move the shuttle sufficiently far to limit the flow of hot fluid through the hot fluid inlet to reduce the temperature of the fluid within the first cavity is at or below the set point temperature.

13. The device of claim 1, wherein when in the second configuration, the temperature of the fluid within first cavity can remain above the set point temperature indefinitely without the thermostatic element being able to transition the shuttle from the hot fluid high flow position.

14. The device of claim 1, wherein when in the second configuration, the temperature of the fluid within first cavity can remain above the set point temperature indefinitely without the thermostatic element being able to transition the shuttle sufficiently far from the hot fluid high flow position toward the hot fluid low flow position to allow the temperature of the fluid within the first cavity to be equal to or below the set point temperature.

15. A method of disinfecting a fluid supply system including an anti-scald device according to claim 1, the method comprising:
transitioning the anti-scald assembly from the first configuration to the second configuration;
passing hot fluid through the first cavity at a temperature greater than the set point temperature.

16. The method of claim 15, wherein the step of transitioning the anti-scald assembly positions the thermostatic element or shuttle relative to the hot fluid inlet such that regardless of the temperature of fluid within the first cavity, the thermostatic element cannot position the shuttle relative to the hot fluid inlet to sufficiently limit flow of hot fluid into the first cavity to reduce the temperature of the fluid within the first cavity to or below the set point temperature.

17. The method of claim 15, wherein:
the anti-scald assembly includes a carrier element movably mounted relative to the housing for motion between a first position and a second position, the carrier element operably adjusting a position of the thermostatic element relative to the hot fluid inlet;
the carrier element being positioned in the first position when the anti-scald assembly is in the first configuration;
the carrier element being positioned in the second position when the anti-scald assembly is in the second configuration;
the step of transitioning the anti-scald assembly from the first configuration to the second configuration includes moving the carrier element from the first position to the second position.

18. The method of claim 17, wherein moving the carrier element form the first position to the second position includes threadedly moving the carrier element relative to the housing.

19. The method of claim 18, wherein:
the anti-scald device further comprises a set point temperature adjustment member adjustably positionable relative to the carrier element, whereby adjustment of a position of the set point temperature adjustment member relative to the carrier element adjusts the position of the thermostatic element relative to the carrier element to adjust the set point temperature when the anti-scald assembly is in the first configuration; and
moving the carrier element from the first position to the second position also moves the set point temperature adjustment member relative to the hot fluid inlet but does not adjust the position of the set point temperature adjustment member relative to the carrier element.

20. The method of claim 15, wherein the step of transitioning the anti-scald assembly from the first configuration to the second configuration requires only adjusting the position of at least one component of the anti-scald assembly relative to the hot fluid inlet.

21. An anti-scald device for a fluid supply system comprising:
a housing having:
a first cavity including a hot fluid inlet, a cold fluid inlet and a first cavity outlet through which fluid exits the first cavity;
a second cavity including a tempered fluid inlet, a cold fluid inlet and a second cavity outlet through which fluid exits the second cavity, the tempered fluid inlet being in fluid communication with the first cavity outlet such that fluid exiting the first cavity through the first cavity outlet flows into the second cavity through the tempered fluid inlet;
an anti-scald assembly positioned, at least in part, within the first cavity, the anti-scald assembly having a thermostatic element coupled to a shuttle, the thermostatic element moves the shuttle relative to the hot fluid inlet between a hot fluid low flow position and a hot fluid high flow position in response to a temperature of fluid within the first cavity to maintain the temperature of the fluid exiting the first cavity through the first cavity outlet at or below a set point temperature;
a valve member adjustably positioned within the second cavity for adjusting a flow of a least one of the flow of fluid into the second cavity through the tempered fluid inlet and through the cold fluid inlet to control an outlet temperature of the fluid exiting the anti-scald device.

22. The device of claim 21, wherein:
the valve member is a tubular mixing barrel that is a tubular member having a tempered fluid aperture formed through a sidewall of the mixing barrel and a cold fluid aperture formed through the sidewall of the mixing barrel;
adjusting the position of the mixing barrel within the second cavity adjusts a temperature of a fluid exiting the second cavity outlet by adjusting:
an alignment of the temperature fluid aperture with the tempered fluid inlet to adjust a flow of fluid into the second cavity through the temperature fluid inlet and
an alignment of the cold fluid aperture with the cold fluid inlet to adjust a flow of fluid into the second cavity through the cold fluid inlet.

23. The device of claim 22, wherein the flow of fluid through the second cavity outlet does not directly affect the thermostatic element of the anti-scald assembly.

24. The device of claim 22, wherein:
the tempered fluid aperture has a varying cross-section when moving angularly about a rotational axis of the mixing barrel;
the cold fluid aperture has a varying cross-section when moving angularly about a rotational axis of the mixing barrel.

25. The device of claim 23, wherein the tempered fluid aperture increases in dimension when moving angularly in a first direction about the rotational axis and the cold fluid aperture increases in dimension when moving angularly in a second direction, opposite the first direction, about the rotational axis.

26. The device of claim 24, wherein the valve member allows for adjusting the outlet temperature to a temperature below the set point temperature by a user.

* * * * *